United States Patent [19]

Felix

[11] Patent Number: 5,471,645
[45] Date of Patent: Nov. 28, 1995

[54] METHOD OF ALLOCATING CHANNELS IN MULTI-RATE CHANNEL ENVIRONMENT

[75] Inventor: Kenneth A. Felix, Crystal Lake, Ill.

[73] Assignee: Motorola, Schaumburg, Ill.

[21] Appl. No.: 950,540

[22] Filed: Sep. 25, 1992

[51] Int. Cl.⁶ ................................... H04B 15/00
[52] U.S. Cl. .................... 455/34.2; 455/54.1; 455/62; 370/84
[58] Field of Search .................. 455/54.1, 54.2, 455/62, 58.2, 161.3, 34.1, 34.2; 370/84, 85.7; 375/121

[56] References Cited

U.S. PATENT DOCUMENTS

| | | | |
|---|---|---|---|
| 4,365,347 | 12/1982 | Otsuka | 455/62 |
| 4,597,104 | 6/1986 | Ohki et al. | 455/58.2 |
| 4,805,167 | 2/1989 | Leslie et al. | 370/84 |
| 5,070,536 | 12/1991 | Mahany et al. | 370/84 |
| 5,093,926 | 3/1992 | Sasuta | 455/62 |

*Primary Examiner*—Edward F. Urban
*Assistant Examiner*—Andrew Faile
*Attorney, Agent, or Firm*—Anthony G. Sitko

[57] ABSTRACT

A method is provided of allocating channels in a trunked radio frequency communication system having a plurality of channels, each with a channel rate. The method includes the steps of transmitting channel characteristics on idle channels of the plurality of channels by a base site. Idle channels are then scanned for channel characteristics by a communication unit. The method also includes the step of seizing an idle channel, by the communication unit, based, at least in part, upon the channel characteristics.

12 Claims, 2 Drawing Sheets

100

METHOD OF ALLOCATING CHANNELS IN MULTI-RATE CHANNEL ENVIRONMENT

FIELD OF THE INVENTION

The invention relates to communication systems and in specific to trunked communication systems.

BACKGROUND OF THE INVENTION

Cellular communication systems are known. Such systems are typically comprised of a number of base sites, each having a service coverage area, distributed throughout a geographic area. The service coverage areas of the base sites are arranged in such a manner as to provide substantially continuous service to communication units passing through such a geographic area.

Communication services within such a system are typically provided on a radio frequency (rf) channel temporarily allocated by the base site to a communication unit for use in exchanging a communicated signal between base site and communication unit. Such rf channel is typically one of many channels ($f_1$-$f_n$) available through the base site.

Allocation of the rf channel within a cellular system is typically based upon perception of a need for communication services. Such perception of a need may be based upon an access request transmitted by the communication unit or an acknowledgment of a page transmitted by the communication unit.

Access requests and paging responses within a communication system are typically transmitted on inbound frequencies of a control channel unique to a particular base site. Pages are typically transmitted on an outbound frequency of the control channel.

Following receipt of the access request or paging response by the base site, the base site and communication unit proceed through the process of channel set-up either on the control channel or on an auxiliary control channel designated by the base site.

During channel set-up the base site determines the characteristics of the communication channel needed by the communication unit. During channel set-up the communication unit may request a full rate, a half rate, or a quarter rate channel. Following channel set-up the base site assigns the communication unit to a traffic channel having the characteristics requested by the communication unit. The communication unit moves to the traffic channel and begins exchanging a communicated signal on the assigned channel.

Personal communication networks (PCNs) are also known. PCNs are short-range cellular communication devices constructed for use within shopping malls, sports stadiums, or other limited coverage areas. Base sites for PCNs tend to be low power units that may, or may not, provide handoff among base sites. Service offered under PCN may be characterized as basic, while allowing a user to make and receive calls within prescribed areas.

While cellular systems and system controls have worked well in the past in cellular environments, the control algorithm used between base and communication unit is not well suited for PCNs. PCNs are constructed for pedestrian traffic and do not need the sophistication of control necessary for vehicular traffic. A need exists for a method of PCN channel allocation that is simple to use in the PCN environment and consistent with service levels of PCNs.

SUMMARY OF THE INVENTION

A method is provided of allocating channels in a trunked radio frequency communication system having a plurality of channels, each with a channel rate. The method includes the steps of transmitting channel characteristics on idle channels of the plurality of channels by a base site. Idle channels are then scanned for channel characteristics by a communication unit. The method also includes the step of seizing an idle channel, by the communication unit, based, at least in part, upon the channel characteristics.

DETAILED DESCRIPTION OF THE PREFERRED EMBODIMENT

The solution to the problem of channel allocation in personal communication networks lies, conceptually, in the transmission, by base sites, of channel characteristics on idle channels. Mobile communication units, within such systems and in advance of seeking access to the system, scan idle channels for suitable characteristics. Upon identifying a suitable channel the communication unit seizes the channel for its own use.

Base sites in such a system transmit variables such as channel capacity at maximum values. Transmitting maximum values beneficially assures that a channel will be used to its greatest potential by causing communication units not seeking a high capacity channel to continue scanning for a channel of a lesser capacity thereby matching needs or requirements of the communication unit to availability. Such scanning and identification reduces the control requirements of base sites and avoids fragmentation of high capacity channels.

A communication unit within such a system may receive service from the system at a variety of service levels. Such service levels may be a reflection of service quality or voice processing efficiency. Communication units with lower levels of efficiency or requiring a higher quality of service may obtains system access at a higher level of service on a higher capacity channel. Communication units that process speech information more efficiently or who do not require such a high service quality level may request system access at a lower level of service.

Higher levels of service may require a full rate traffic channel. Lower levels of service may involve half-rate, quarter-rate, or even one-eighth rate traffic channels at reduced service rates. Handoff between base sites may be an option available at any service level.

Upon seeking access, communication units scan for channel characteristics upon which the scanning communication unit can most efficiently operate consistent with a pre-established service level. The communication unit identifies such a channel by attempting to match its own operating characteristics with channel characteristics transmitted by the base sites on idle channels. If upon completing a first scan a match is not found, then the communication unit selects a next higher capacity channel and transmits an access request. The base site upon receiving such a request may grant the request, transmit an identifier of a more appropriate channel, or transmit a system busy response.

Figure 1:
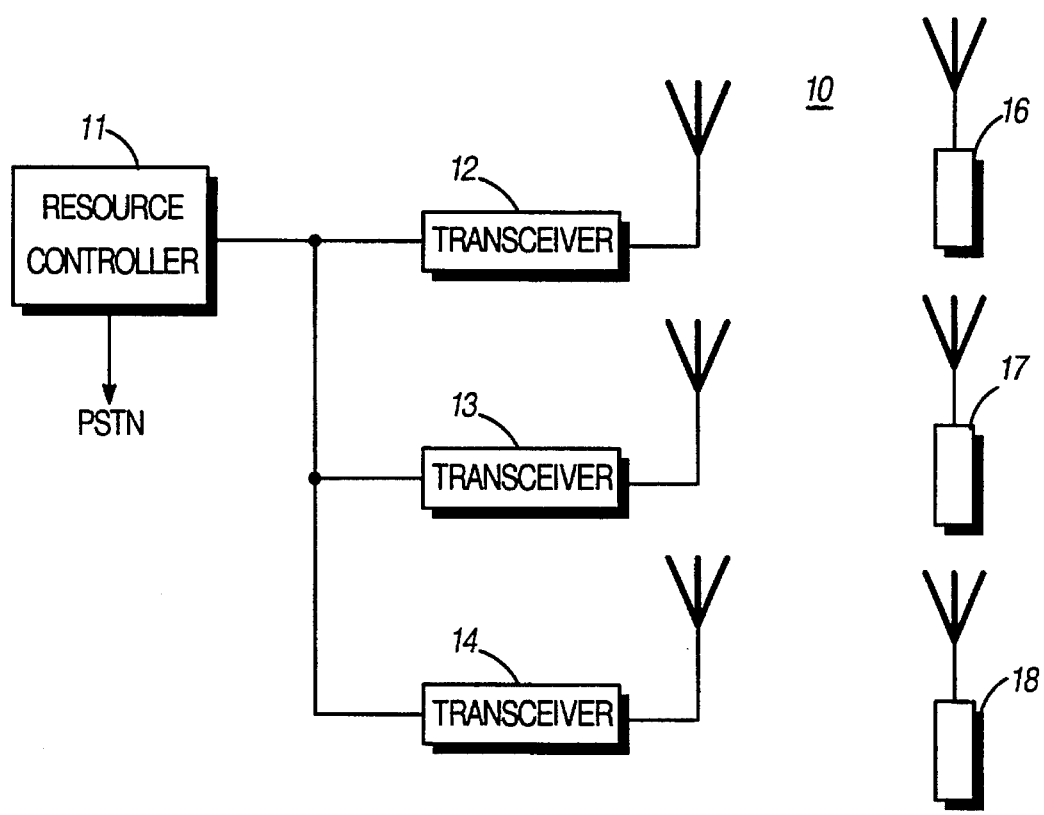
FIG. 1 comprises a block diagram of a base site in accordance with one embodiment of the invention.

FIG. 1 is a block diagram of a base site, generally, (10) of a communication system, in accordance with the invention. Included at the base site (10) is a resource controller (11), and transceivers (12-14). Also shown in FIG. 1 are communication units (16-18).

Figure 2:
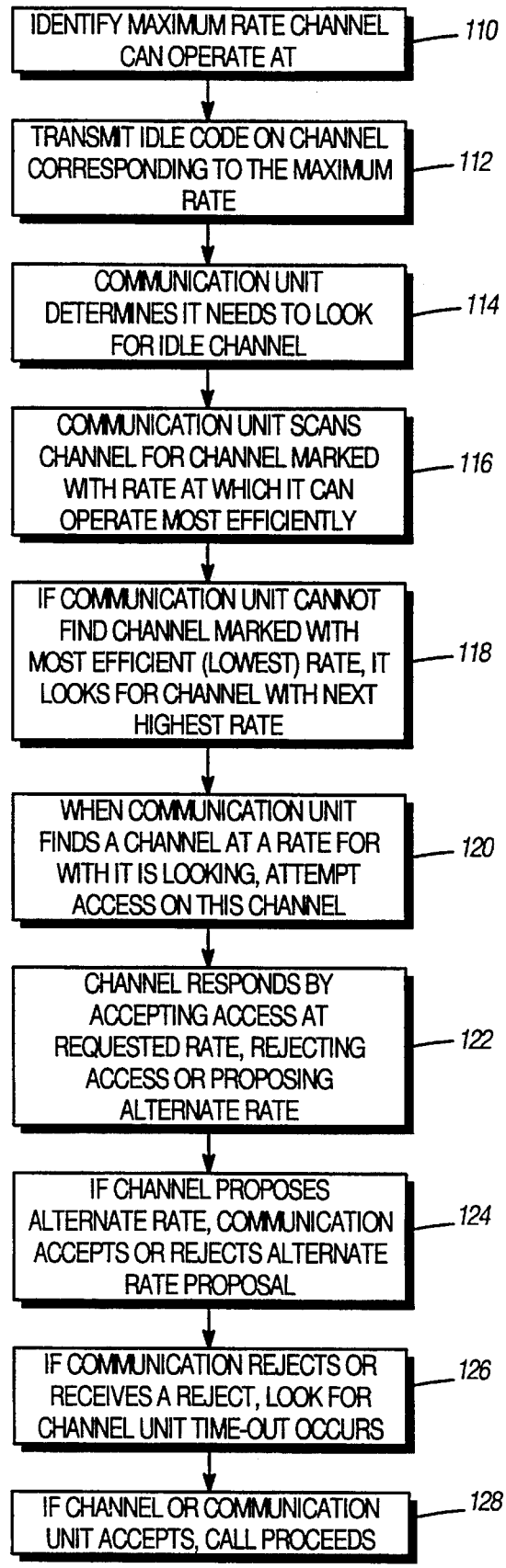
FIG. 2 is a flowchart depicting the allocation of channels under a preferred embodiment of the present invention.

FIG. 2 generally depicts, in flowchart form, the steps of allocating a channel according to a preferred embodiment of the present invention. Reference may be made to FIG. 2, as appropriate, throughout the following description of the preferred embodiments of the invention.

Signaling protocols within the system may be based as under any of a number of prior art techniques (e.g., Global System for Mobile Communications (GSM), as specified in GSM recommendations available from the European Telecommunications Standards Institute (ETSI)). Control and traffic channels may also be arranged under a time division multiplex (TDM) format (e.g., GSM with slot 0 designated as a broadcast control channel. transmitted (inter alai) on the outbound channel (base site to communication unit) is a system identifier, locations of traffic channels (slots and alternate frequencies), and access options.

Communications units (16-18), upon activation, scan for the control channel (slot 0) of a nearby base site and monitor for paging messages. Upon detecting a paging message or upon desiring to make a call, 114 the communication unit (16-18) uses system information received in slot 0 to identify and scan traffic channels for a channel having the desired characteristics (e.g., channel rate) needed by the communication unit (16-18). The communication system by monitoring present channel assignments can identify the communication rates available on each of the channels. From these available rates, the maximum is identified, 110, and transmitted as a portion of the system information in slot 0, 112.

Upon locating such a channel, 116, (e.g., slot 2) the communication unit (16-18) may request access on the following frame or continue to monitor the channel for additional frames before transmitting an access request. Delaying the access request in certain implementations may ensure that the channel is, in fact, idle.

Following the receipt of the three frames indicating that the channel is idle, the communication unit (16-18) transmits an access request on the identified channel, 120, including a requested channel rate and an identifier of the requesting communication unit (16-18). The base site (10), upon receipt of such a request and upon verification that the communication unit (16-18) is registered within the system at the service rate of the channel requested, verifies that the channel is capable of the requested rate. Upon making such a determination the base site (10) makes a further determination based upon the identity of the type of communication unit (16-18) as to the most efficient rate (from the system point of view) at which the communication unit (16-18) will be allowed to operate. (If the system is heavily loaded and the communication unit (16-18) requests a full rate channel but is capable of operation on a half-rate channel, then the base site (10) may determine that the most efficient rate is a half-rate channel.)

Upon determination of the most efficient rate from the system point of view, the base site (10) responds to the requesting communication unit (16-18) with an instruction indicating a suggested rate to the requesting communication unit (16-18), 122. The suggested rate may be on the originally requested channel or another channel identified to the communication unit (16-18) by the base site (10). The communication unit (16-18) may either accept or reject such rate, 124. If the communication unit (16-18) rejects such rate, then a call reject instruction is returned by the base site (10) and the call is ended.

If the communication unit (16-18) returns an acceptance of the suggested rate the base site returns an access grant. The base site indicates such grant by transmitting a channel acceptance message to the requesting communication unit.

If, upon receipt of the channel request, the base site (10) does not recognize the communication unit (16-18), or the communication unit (16-18) is not eligible for the service rate of the channel requested, then the base site (10) transmits a call reject instruction to the requesting communication unit (16-18). The communication unit (16-18) must then re-scan for an appropriate channel before re-requesting access, 126. If a suitable communication channel is not identified within a fixed time period, the user is notified of the unavailability of the system by an appropriate signal.

If upon scanning idle channels the communication unit (16-18) does not find an appropriate channel, then the communication unit (16-18) transmits an access request on an identified channel of the next higher rate, 118. The base site (10), upon receipt of such a request, may grant access on the identified channel or transmit the identity of another channel of the same or lesser capacity than the identified channel. As above the communication unit (16-18) may either accept or reject. If the communication unit (16-18) accepts then call set-up proceeds on the accepted channel as in the prior art, 128.

I claim:

1. A method of allocating channels in a trunked radio frequency communications system having a plurality of channels, each with a channel rate, the method comprising the steps of: transmitting channel characteristics, including a maximum rate at which the channel can operate at on idle channels of the plurality of channels by a base site; scanning the idle channels for the channel characteristics by a communication unit; and, seizing an idle channel, by the communication unit, based at least in part, upon matching a most efficient communication rate of the communication unit with the maximum rate at which the channel can operate.

2. The method of claim 1 further including the step of selecting a channel for seizure by substantially matching the channel characteristics of the idle channels with the operating characteristics of the communication unit.

3. The method of claim 2 further including the step of scanning for a higher rate channel upon failing to match the channel characteristics.

4. The method of claim 1 further including the step of transmitting an access request, by the communication unit to the base site, on the seized channel.

5. A method of allocating channels in a trunked radio frequency communication system having a plurality of channels, each with a channel rate, the method comprising the steps of: transmitting a maximum channel rate code, by a base site, on each idle channel of the plurality of channels assigned to the base site; scanning channels, by a communication unit, for a channel with a maximum channel rate that can be efficiently used by the communication unit and, seizing an idle channel, by the communication unit based, at least in part, upon the maximum channel rate code of the seized idle channel.

6. The method of claim 5 further including the step of selecting a channel for seizure by substantially matching the channel rate codes of the idle channels with the channel rate of the communication unit.

7. The method of claim 6 further including the step of scanning for a higher rate channel upon failing to match characteristics the channel rate codes.

8. The method of claim 5 further including the step of transmitting an access request, by the communication unit to the base site, on the seized channel.

9. A method of allocating channels in a trunked radio frequency communication system having a plurality of channels including a first idle channel having a first channel rate and an at least second idle channel having a second channel rate, the method including the steps of: transmitting, by a base site, a first and second channel rate code on the first channel and on the at least second channel, respectively; receiving and decoding the first and second channel rate codes by a communication unit; and, seizing the channel of the first and the at least second channel having the channel rate most efficiently used by the communication unit.

10. The method of claim 9 further including the step of selecting a channel for seizure by substantially matching the first and second channel rate codes of the first and the at least second idle channels with the channel rate of the communication unit.

11. The method of claim 10 further including the step of scanning for a higher rate channel upon failing to match the channel rate codes.

12. The method of claim 9 further including the step of transmitting an access request, by the communication unit to the base site, on the seized channel.

* * * * *